US008888109B2

(12) United States Patent
Stubbs

(10) Patent No.: US 8,888,109 B2
(45) Date of Patent: Nov. 18, 2014

(54) LOAD CARRYING APPARATUS

(75) Inventor: Edward John Peter Stubbs, South Yorkshire (GB)

(73) Assignee: Loadhog Limited, Sheffield (GB)

( * ) Notice: Subject to any disclaimer, the term of this patent is extended or adjusted under 35 U.S.C. 154(b) by 47 days.

(21) Appl. No.: 13/810,336

(22) PCT Filed: Jul. 27, 2011

(86) PCT No.: PCT/GB2011/001123
§ 371 (c)(1),
(2), (4) Date: Jan. 15, 2013

(87) PCT Pub. No.: WO2012/017188
PCT Pub. Date: Feb. 9, 2012

(65) Prior Publication Data
US 2013/0119624 A1 May 16, 2013

(30) Foreign Application Priority Data

Aug. 2, 2010 (GB) .................................. 1012933.6
Jan. 14, 2011 (GB) .................................. 1100607.9

(51) Int. Cl.
B62D 33/08 (2006.01)
B65D 19/42 (2006.01)
B62B 5/00 (2006.01)
B62B 3/02 (2006.01)
B62B 5/04 (2006.01)

(52) U.S. Cl.
CPC . *B62B 3/02* (2013.01); *B65D 19/42* (2013.01); B65D 2519/00034 (2013.01); *B62B 5/00* (2013.01); B65D 2519/00781 (2013.01); B65D 2519/00273 (2013.01); B65D 2519/00288 (2013.01); B65D 2519/00333 (2013.01); *B62B 5/0093* (2013.01); B62B 5/0433 (2013.01); B65D 2519/00069 (2013.01); B65D 2519/00323 (2013.01); *B62B 5/049* (2013.01); B65D 2519/00412 (2013.01); *B62B 5/0006* (2013.01); B65D 2519/00407 (2013.01)
USPC ............................................ 280/30; 280/43.12

(58) Field of Classification Search
USPC .......................... 280/30, 79.11, 43.12, 43.14
See application file for complete search history.

(56) References Cited

U.S. PATENT DOCUMENTS

| 2,192,337 | A | * | 3/1940 | Tiffany | 280/43.14 |
| 3,054,623 | A | * | 9/1962 | Simpkins | 280/43.14 |
| 3,216,531 | A | * | 11/1965 | Hutchinson | 188/5 |
| 4,073,369 | A | * | 2/1978 | Nordskog | 188/5 |

(Continued)

FOREIGN PATENT DOCUMENTS

DE 202009009056 12/2009
EP 0529544 3/1993

(Continued)

Primary Examiner — J. Allen Shriver, II
Assistant Examiner — Jacob Meyer
(74) Attorney, Agent, or Firm — Clark Hill PLC

(57) ABSTRACT

A load carrying apparatus (10) comprising a body (12) and a roller arrangement (18, 22) to allow the apparatus to be moved along the ground. The load carrying apparatus includes a bearer arrangement (34, 36) movable relative to the body between a ground engaging condition in which the bearer arrangement can engage the ground and a retracted condition in which the bearer arrangement is retracted. The load carrying apparatus includes shielding members on the body, separate from the bearer arrangement, the shielding members (28) extending around the roller arrangement. In one embodiment, the load carrying apparatus comprises a combination dolly-pallet.

18 Claims, 4 Drawing Sheets

(56) References Cited

U.S. PATENT DOCUMENTS

| | | | |
|---|---|---|---|
| 6,098,761 A | 8/2000 | Kooima et al. | |
| 6,309,169 B1 | 10/2001 | Carlile | |
| 7,213,820 B2 * | 5/2007 | Drummond | 280/79.11 |
| 7,537,222 B2 * | 5/2009 | Hadar | 280/43.12 |
| 7,891,675 B2 * | 2/2011 | Dobra et al. | 280/43.12 |
| 8,006,985 B2 * | 8/2011 | Facey et al. | 280/43.14 |
| 8,403,344 B2 * | 3/2013 | Carver et al. | 280/79.11 |
| 2005/0002766 A1 * | 1/2005 | Hartmann et al. | 414/467 |
| 2007/0057475 A1 * | 3/2007 | Hadar | 280/43.12 |
| 2007/0102599 A1 | 5/2007 | Lin | |
| 2007/0170676 A1 * | 7/2007 | Hilditch | 280/79.11 |
| 2007/0186827 A1 * | 8/2007 | Loftus et al. | 108/57.15 |
| 2008/0238010 A1 * | 10/2008 | Hadar | 280/43.12 |
| 2008/0315537 A1 * | 12/2008 | Dobra et al. | 280/6.15 |
| 2009/0230644 A1 | 9/2009 | Stanley | |
| 2009/0236809 A1 * | 9/2009 | Carver et al. | 280/43.12 |
| 2010/0187782 A1 * | 7/2010 | Facey et al. | 280/30 |
| 2013/0119623 A1 * | 5/2013 | Sadeh et al. | 280/30 |
| 2013/0121800 A1 * | 5/2013 | Hacko et al. | 414/800 |

FOREIGN PATENT DOCUMENTS

| | | |
|---|---|---|
| EP | 0666208 | 8/1995 |
| EP | 1526058 | 4/2005 |
| WO | 2008017798 | 2/2008 |

* cited by examiner

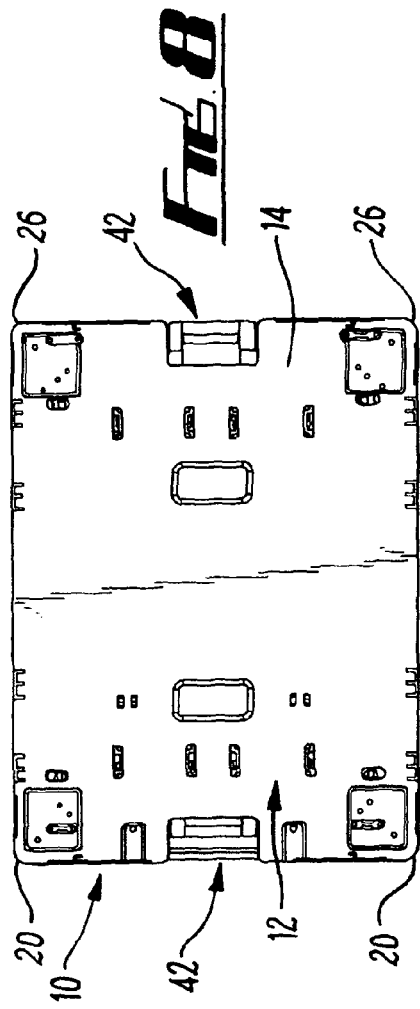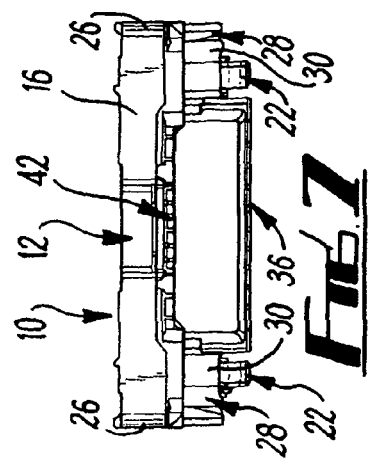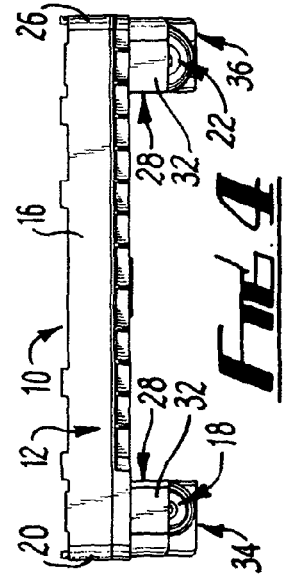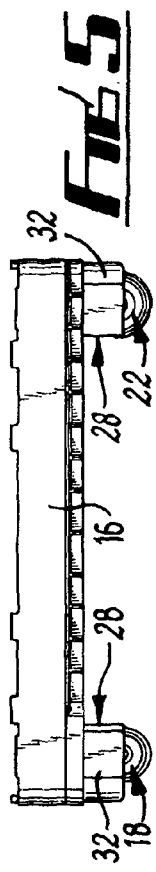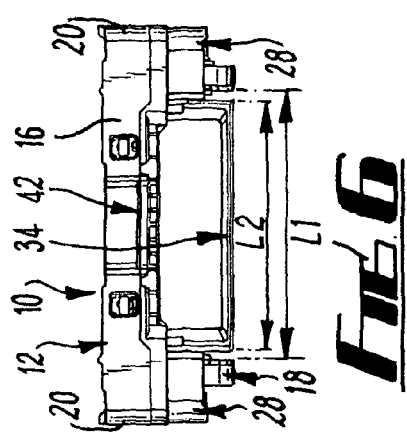

LOAD CARRYING APPARATUS

RELATED/PRIORITY APPLICATION

This application is a National Phase filing regarding International Application No. PCT/GB2011/001123, filed on Jul. 27, 2011, which relies upon Great Britain Application No. 1012933.6, filed on Aug. 2, 2010, and Great Britain Application No, 1100607.9, filed on Jan. 14, 2011, for priority.

This invention relates to load carrying apparatus. More particularly, but not exclusively, this invention relates to dollies. The invention may relate to pallets. Embodiments of the invention relate to combination dolly-pallets.

Dollies which can be converted to pallets are known. An example of such a dolly is described in patent specification No. WO 2008/017798. A problem with such dollies is that the mechanism used to convert the dolly to a pallet, and vice versa, can be damaged by collisions with mechanical handling equipment.

According to one aspect of this invention, there is provided a load carrying apparatus comprising a body, a roller arrangement to allow the apparatus to be moved along the ground, a bearer arrangement movable relative to the body between a ground engaging condition in which the bearer arrangement can engage the ground and a retracted condition in which the bearer arrangement is retracted, and shielding means separate from the bearer arrangement, the shielding means being mounted on the body and extending around the roller arrangement.

According to a further aspect of this invention, there is provided a load carrying apparatus comprising a body, a roller arrangement to allow the apparatus to be moved along the ground, and a bearer arrangement movable relative to the body between a ground engaging condition in which the bearer arrangement can engage the ground and a retracted condition in which the bearer arrangement is retracted, wherein the bearer arrangement is substantially devoid of shielding features that extend around the roller arrangement to shield the roller arrangement against impact.

The roller arrangement may comprise a plurality of rollers. The roller arrangement may comprise a pair of rollers. The rollers may be spaced from each other by a first distance. The bearer arrangement may have a total length which is a second distance. The first distance may be greater than the second distance.

According to another aspect of this invention, there is provided a load carrying apparatus comprising a body, a pair of rollers to allow the apparatus to be moved along the ground, and a bearer arrangement movable relative to the body between a ground engaging condition in which the bearer arrangement can engage the ground and a retracted condition in which the bearer arrangement is retracted, wherein the rollers are spaced from each other by a first distance and the bearer arrangement has a total length which is a second distance, the first distance being greater than the second distance.

According to yet another aspect of this invention, there is provided a combination dolly-pallet comprising: a body; first and second roller arrangements to allow the dolly-pallet to be moved along the ground, each roller arrangement comprising two rollers; first and second bearer arrangements movable relative to the body between a ground engaging condition in which the bearer arrangements can engage the ground and a retracted condition in which the bearer arrangement is retracted; a drive mechanism to move the first and second bearer arrangements between the ground engaging and the retracted conditions, the drive mechanism being configured to lift the first and second roller arrangements from the ground when the bearer arrangements are moved to the ground engaging condition; and shielding means separate from the bearer arrangements, the shielding means being mounted on the body and extending around the roller arrangements.

According to a still further aspect of the invention, there is provided a combination dolly-pallet comprising: a body; a roller arrangement to allow the dolly-pallet to be moved along the ground; a bearer arrangement movable relative to the body between a ground engaging condition in which the bearer arrangement can engage the ground and a retracted condition in which the bearer arrangement is retracted; and shielding means separate from the bearer arrangement, wherein the shielding means is detachably mounted on the body and extends around the roller arrangement.

The bearer arrangement may be disposed between the rollers of said pair. The pair of rollers may be provided at an end region of the body. The pair of rollers may be provided at a front or a rear end region of the body.

The shielding means may be detachably mounted on the body. The shielding means may comprise pair of shielding members on the body. Each shielding member may extend around a respective one of the rollers of said pair. Each shielding member may be detachably mounted on the body.

The load carrying apparatus may include a drive mechanism to move the bearer arrangement between the ground engaging and the retracted conditions. The drive mechanism may comprise features as described in patent specification No. WO 2008/017798.

The load carrying apparatus may comprise a plurality of bearer arrangements. Each bearer arrangement may be movable between the ground engaging condition and the retracted condition. The apparatus may comprise first and second bearer arrangements. Each bearer arrangement may be provided at a respective opposite end region of the body. In the embodiment described herein, the, or each, bearer arrangement is provided separately from, and movable independently of, the shielding means.

The load carrying apparatus may comprise a dolly, which may be convertible to a pallet by moving the bearer arrangement to the ground engaging condition. The load carrying apparatus may comprise a combination dolly-pallet. In one embodiment, the combination dolly-pallet may be movable between a dolly condition and a pallet condition. The combination dolly-pallet may be in a dolly condition when the, or each, bearer arrangement is in the retracted condition. The combination dolly-pallet may be in a pallet condition when the, or each, bearer arrangement is in the ground engaging condition. Desirably, the roller arrangement may be lifted from the ground when the, or each, bearer arrangement moves to the ground engaging condition.

The drive mechanism may be configured to move the bearer arrangements between the ground engaging and retracted conditions substantially simultaneously with each other. The drive mechanism may be configured to lift the roller arrangements from the ground substantially simultaneously with each other An operating member may be provided on the drive mechanism to operate the drive mechanism. Two operating members may be provided to operate the drive mechanism. Each operating member may be provided at a respective opposite end of the body. The, or each, operating member may comprise a lever. The, or each, lever may comprise a pedal.

The, or each, operating member may be movable between an operative position in which the bearer arrangement can be locked in the ground engaging condition or in the retracted condition, and an inoperative condition. Where the drive mechanism comprises two operating members, and the load carrying apparatus comprises two bearer arrangements, the movement of either of said operating members may effect simultaneous movement of the bearer arrangements.

The, or each, bearer arrangement may comprise a bearer member and a connecting member to connect the bearer member to the drive mechanism. The, or each, bearer arrangement may comprise a pair of connecting members arranged respectively at opposite ends of the bearer member.

The, or each, connecting member may be substantially flat, and may extend upwardly from the bearer member.

The body may comprise a platform on which the load can be carried. The body may further include a skirt extending downwardly from the platform. The, or each, bearer arrangement may be provided within the skirt.

The apparatus may include first and second roller arrangements. The shielding means may be fixed relative to the, or each, roller arrangement.

Each roller arrangement may comprise a plurality of rollers. Each roller arrangement may comprise a pair of rollers. The first and second roller arrangements may be disposed at opposite end regions of the body. The rollers may comprise wheels or casters. The rollers of the first roller arrangement may comprise a pair of wheels. The rollers of the second roller arrangement may comprise a pair of casters.

Each of the roller arrangements may be disposed at respective front and rear end regions of the body. The roller arrangement disposed at the front end region may comprise rollers in the form of casters. The roller arrangement disposed at the rear end region may comprise rollers in the form of wheels. A respective bearer arrangement may be disposed between each pair of rollers. A respective one of the bearer arrangements may be disposed between each pair of rollers.

The shielding means may be detachably mounted on the body. The shielding means may comprise a plurality of shielding members. A respective shielding member may be disposed around each roller.

The shielding members may be detachably mounted on the body. Each shielding member may comprise first and second shielding portions arranged substantially at right angles to each other. Fasteners may be provided to fasten each shielding member to the body so that it extends around the roller. The fasteners may extend through the body to the respective shielding member. The fasteners may comprise bolts. The bolts may be threadably secured to the respective shielding member, or may extend through the shielding member, to be secured to the shielding member by threadably engaging a nut.

Where the apparatus has two pairs of rollers, the apparatus may comprise a respective pair of shielding members for each pair of rollers.

The drive mechanism may be configured to lift the, or each, roller arrangement from the ground when the, or each, bearer arrangement is moved to the ground engaging position.

An embodiment of the invention will now be described by way of example only, with reference to the accompanying drawings, in which:

FIG. 4 is a side view of the load carrying apparatus, showing the bearer arrangements in the ground engaging conditions;

FIG. 5 is the same view as FIG. 4, but showing the bearer arrangements in the retracted conditions;

FIG. 6 is a front view of the load carrying apparatus;

FIG. 7 is a rear view of the load carrying apparatus;

FIG. 8 is a top view of the load carrying apparatus;

Figure 1:
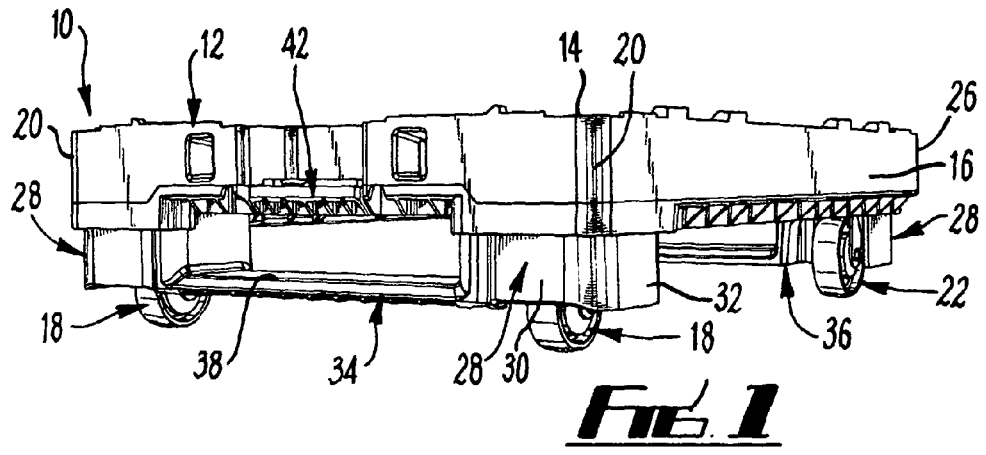
FIG. 1 is a front perspective view of a load carrying apparatus with a bearer arrangement in a retracted condition, showing an operating member in an inoperative position.

FIG. 1 shows a load carrying apparatus 10. The embodiment of the load carrying apparatus 10 shown in the drawings is in the form of a combination dolly-pallet, which is movable between a dolly condition and a pallet condition, as explained in more detail below. The load carrying apparatus 10 comprises a body 12 having a platform 14 with a downwardly extending skirt 16.

Figure 9:
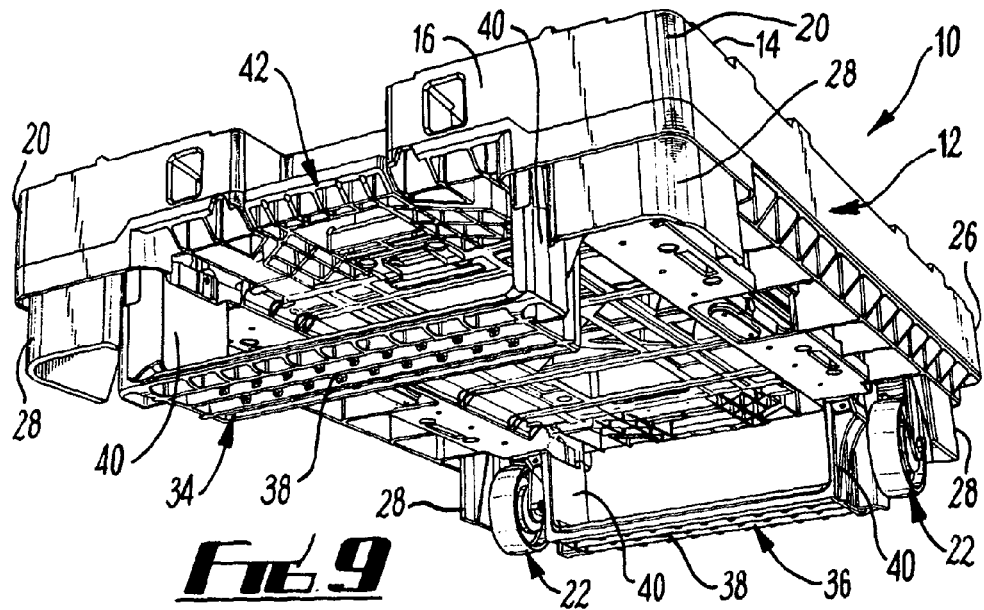
FIG. 9 is a perspective view from the front and below of the load carrying apparatus.
Figure 10:
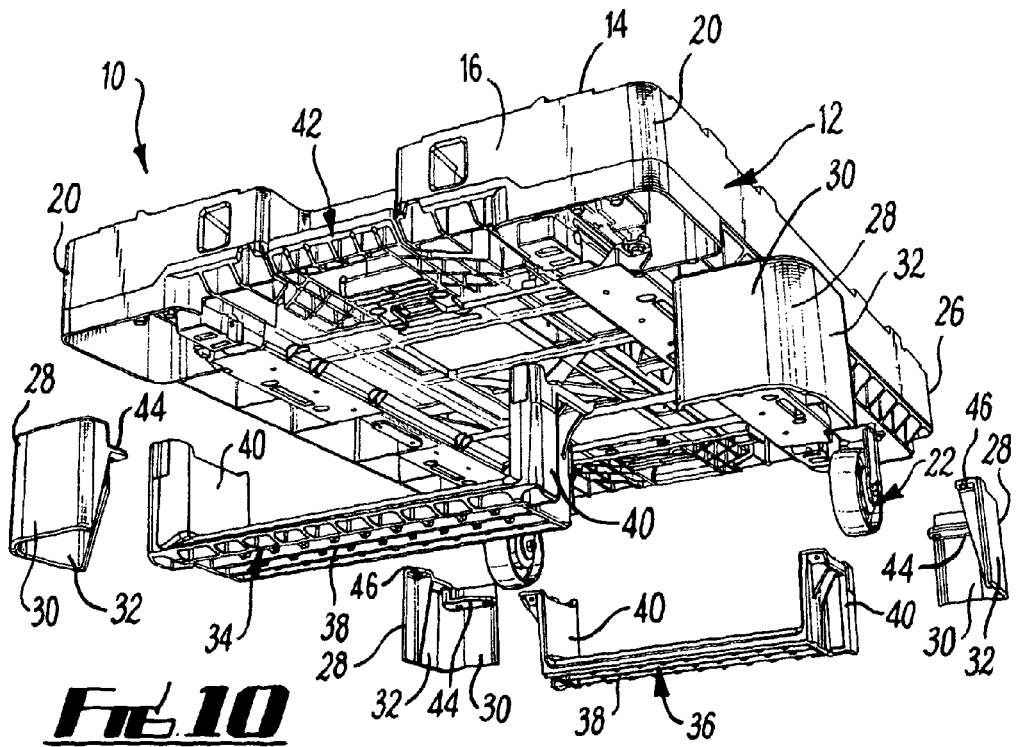
FIG. 10 is the same view of the load carrying apparatus as FIG. 9, but showing the bearer arrangements and the shielding members detached from the body.

A pair of front rollers, in the form of front casters 18, is mounted on the body 12 at a front end region thereof. The front casters 18 may be mounted on the body at front corners 20 of the body 12. A pair of rear rollers, in the form of rear wheels 22, is mounted on the body 12 at a rear end region thereof. The rear wheels 22 may be mounted at rear corners 26 of the body 12. In FIGS. 9 and 10, the casters 18 have been omitted for clarity.

Shielding means in the form of a plurality of shielding members 28 are attached to the body 12 at the front and rear corners 20, 26 around the front casters 18 and the rear wheels 22. Thus, the shielding members 28 are fixed relative to the front casters 18 and the rear wheels 22. Each shielding member 28 comprises first and second shielding portions 30, 32 arranged substantially at right angles to each other. Each shielding member 28 has a generally L-shaped profile.

The load carrying apparatus 10 further includes a front bearer arrangement 34 and a rear bearer arrangement 36. The front bearer arrangement 34 is disposed on the body 12 between the front casters 18. The rear bearer arrangement 36 is disposed on the body 12 between the rear wheels 22.

Figure 2:
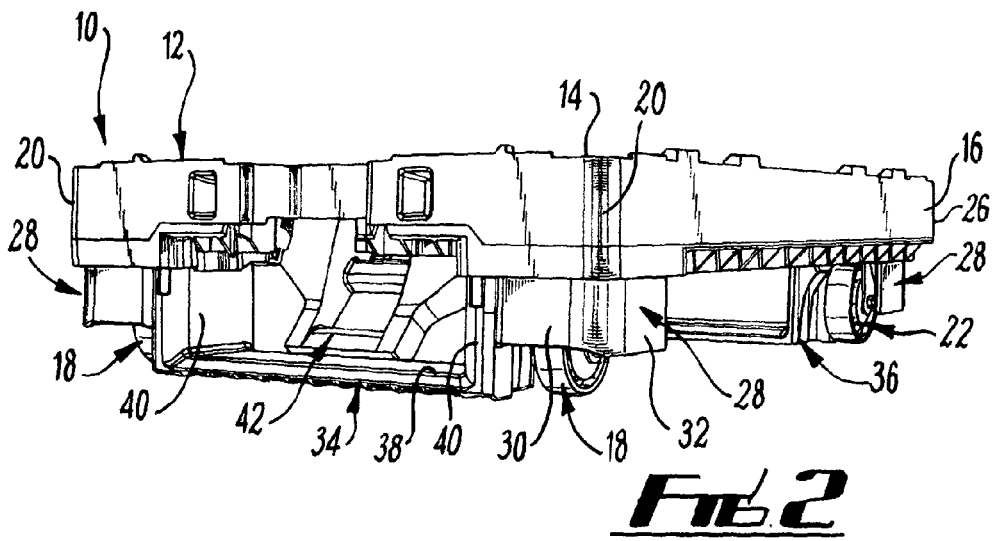
FIG. 2 is a front perspective view of the load carrying apparatus in FIG. 1, with the bearer arrangement in a ground engaging condition, and the operating member in an operative position.
Figure 3:
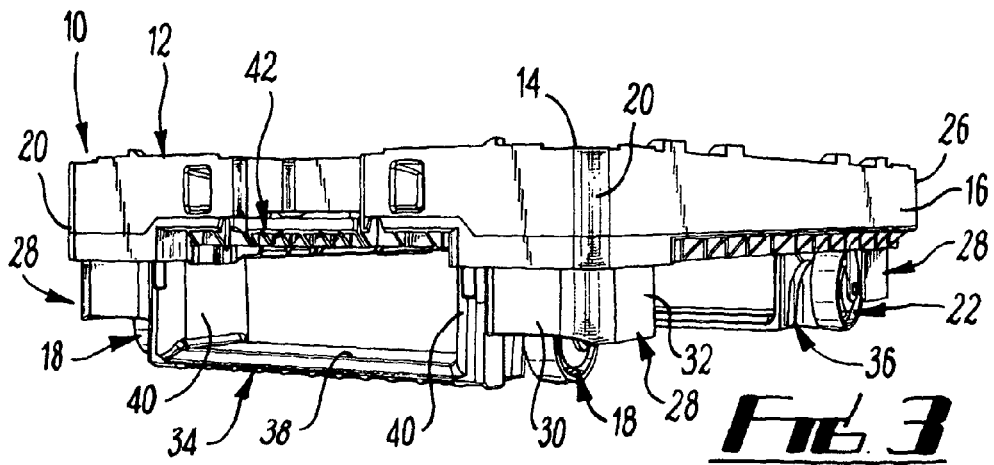
FIG. 3 is a front perspective view of the load carrying apparatus shown in FIG. 1, with the bearer arrangement in the ground engaging condition, and the operating member in an inoperative position.

Each of the front and rear bearer arrangements 34, 36 is movable relative to the body 12 between a retracted condition, shown in FIGS. 1 and 5, and a ground engaging condition, shown in FIGS. 2, 3 and 4. The front and rear bearer arrangements 34, 36 are independent of the shielding members 28 and are movable relative to the shielding members 28.

The bearer arrangements 34, 36 are substantially the same as each other, and each comprises a horizontal bearer member 38 having opposite ends, and two connecting members 40 that extend upwardly from the bearer member. The connecting members 40 connect the bearer arrangements 34, 36 to a drive mechanism (not shown) provided within the body 12.

The drive mechanism is provided to move the bearer arrangements 34, 36 between the ground engaging and retracted conditions. The drive mechanism comprises the features described in prior specification No. WO 2008/017798. The disclosure of specification No. WO 2008/017798 is incorporated herein by reference.

Operating members in the form of front and rear pedals 42 are provided at the front and rear of the body 12. The front and rear pedals 42 are operatively connected to the drive mechanism, as explained in WO 2008/017798, and can be moved between an inoperative position, shown in FIGS. 1 and 3, and an operative position, shown in FIG. 2.

The operation of the drive mechanism is such that when the bearer arrangements 34, 36 are in their retracted conditions, one of the pedals 42 can be moved from the inoperative position to the operative position. This movement of the pedal 42 causes the drive mechanism, in a manner described in WO 2008/017798, to move the bearer arrangements 34, 36 from their retracted positions to their ground engaging conditions, and to lock the bearer arrangements 34, 36 in their ground engaging conditions. The pedal 42 can then be released, and the drive mechanism moves the pedal 42 to the inoperative position.

When the bearer arrangements 34, 36 are in their ground engaging conditions, one of the pedals 42 can be moved from the inoperative position to the operative position to unlock the bearer arrangements 34, 36 from the ground engaging condition. Thereafter, moving the pedal 42 to the inoperative position returns the bearer arrangements 34, 36 to their retracted conditions.

As described in WO 2008/017798, the drive mechanism is such that movement of one of the pedals 42 causes the drive mechanism to move both of the bearer arrangements 34, 36 between the ground engaging and retracted conditions.

When the bearer arrangements 34, 36 are in the ground engaging conditions, the front casters 18 and the rear wheels 22 remain in contact with the ground. Alternatively, if desired, when the bearer arrangements 34, 36 are in the ground engaging conditions the front casters 18 and the rear wheels 22 may be lifted slightly off the ground to ensure that the body 12 is fully supported by the bearer arrangements 34, 36.

As shown in FIG. 1, when the bearer arrangements 34, 36 are in their retracted conditions, the bearer members 38 are level with the lower edges of the shielding members 28. In the embodiment described herein this provides the advantage that it is immediately visible to the user, whether the bearer arrangements 34, 36 are in their ground engaging or retracted conditions.

As can be seen from FIGS. 1 to 4, the bearer arrangements 34, 36 are substantially devoid of any shielding features that extend around the front casters 18 and the rear wheels 22. As described above, the front casters 18 and the rear wheels 22 are shielded by shielding members 28, detachably mounted on the body 12.

The front casters 18 are spaced from each other by a first distance and the rear wheels 22 are spaced from each other by the first distance L1. Each of the first and second bearer arrangements 34, 36 is of a length that is a second distance L2. As can be seen from the drawings, the first distance L1 is greater than the second distance L2.

Figure 11:
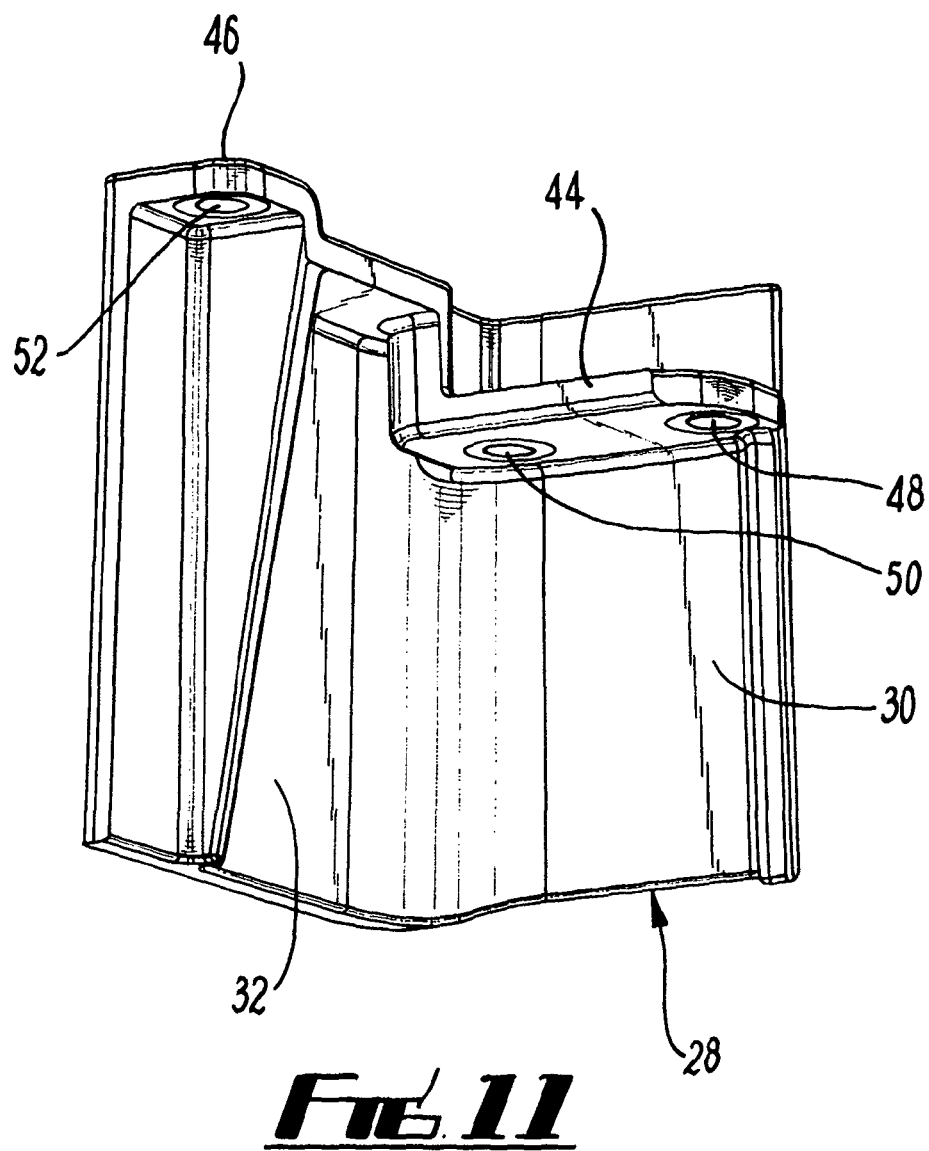
FIG. 11 shows a shielding member.

Referring to FIG. 10, it can be seen that the shielding members 28 are detachable from the body 12. One of the shielding members 28 is shown in FIG. 11. The shielding member 28 shown in FIG. 11 comprises first and second attaching portions 44, 46 extending inwardly from the first and second shielding portions 30, 32 respectively, at right angles thereto. Each attaching portion 44, 46 is generally flat.

The first attaching portion 44 defines two apertures 48, 50, and the second attaching portion 46 defines an aperture 52. Respective fasteners, such as bolts, can be inserted through the apertures to fasten the shielding members to the body 12. The body 12 defines respective threaded recesses which can threadably receive the bolts to effect the aforesaid fastening of the shielding members to the body. Alternatively, each shielding member 28 defines the threaded recesses which can threadably receive the bolts to effect the aforesaid fastening of the shielding members to the body There is thus described a load carrying apparatus 10, an embodiment of which has shielding members 28 on the main body 12. In the embodiment described herein, this provides an advantage over prior art load carrying apparatus. This advantage is that, in the event of an impact on one of the shielding members by, for example, mechanical handling equipment, the force of collision is transmitted to the body 12, rather than to the drive mechanism. This helps to prevent damage to the drive mechanism, and reduces consequent repair costs.

In addition, in the embodiment described above, the detachable shielding members 28 provide the additional advantage that they can be replaced if damaged. This reduces repair costs, over prior art load carrying apparatus for several reasons. For example, with some prior art load carrying apparatus, the shielding members are provided on the bearer arrangements. Therefore, the embodiment of the present invention described herein has the advantage that, if a shielding member 28 is damaged it is necessary only to replace the shielding member 28, whereas with the aforesaid prior art apparatus, the whole bearer arrangement would need to be replaced.

Moreover, by the shielding means being attached to the bearer arrangements as in the prior art, an impact on the shielding members could cause damage to the drive mechanism. This is avoided in the above described embodiment by detachably securing the shielding members 28 to the body 12

Similarly, because the shielding members 28 are detachable from the body 12, in the above described embodiment, any damage to the shielding members 28 will not necessitate replacement of the body 12. Repair of such damage could be effected by simply replacing the shielding member 28.

The provision of detachable shielding members 28 in the embodiment described above provides an initial increase in the cost of manufacture, in that additional tooling is needed to manufacture the shielding members 28. There is also an initial increase in the time spent during assembly, in order to fit the shielding members 28 to the body 12. However, it was realised that there would be an overall benefit, in that repair costs are minimised, because it is only necessary to replace a damaged shielding member, rather than a damaged bearer arrangement or drive mechanism.

Various modifications can be made without departing from the scope of the invention.

The invention claimed is:

1. A combination dolly-pallet comprising; a body; a roller arrangement to allow the dolly-pallet to be moved along the ground; a bearer arrangement movable relative to the body between a ground engaging condition in which the bearer arrangement can engage the ground and a retracted condition in which the bearer arrangement is retracted; and shielding means separate from the bearer arrangement, the bearer arrangement movable relative to the shielding means, wherein the shielding means is detachably mounted on the body and extends around the roller arrangement; wherein the shielding means comprises a plurality of shielding members, and the roller arrangement comprises a plurality of rollers, the shielding members being arranged on the body, such that each roller is shielded by a respective shielding member; and the combination dolly-pallet further includes fasteners to fasten each shielding member to the body so that each shielding member extends around the respective roller, the fasteners extending through the respective shielding member to the body.

2. A combination dolly-pallet according to claim 1, wherein the roller arrangement comprises a pair of rollers, the rollers being spaced from each other by a first distance, and wherein the bearer arrangement has a total length which is a second distance, the first distance being greater than the second distance.

3. A combination dolly-pallet according to claim 2, wherein the bearer arrangement is disposed between the rollers of said pair of rollers.

4. A combination dolly-pallet according to claim 1, wherein the shielding means comprises pair of shielding members on the body, one of the shielding members extending around one of the rollers, and the other shielding member extending around the other roller.

5. A combination dolly-pallet according to claim 4, wherein the shielding members are detachably mounted on the body, each shielding member comprising first and second shielding portions arranged substantially at right angles to each other.

6. A combination dolly-pallet according to claim 1, including two pairs of rollers, one pair being disposed at one end region of the body, and the other pair being disposed at the opposite end region of the body.

7. A combination dolly-pallet according to claim 6, wherein the shielding means comprises two pairs of shielding members on the body, the shielding members being arranged on the body, such that each roller is shielded by a respective shielding member.

8. A combination dolly-pallet according to claim 6, wherein one pair of rollers comprises a pair of wheels, and the other pair of rollers comprises a pair of casters.

9. A combination dolly-pallet according to claim 6, comprising two bearer arrangements, wherein one of the bearer arrangements is disposed between one pair of rollers, and the other bearer arrangement is disposed between the other pair of rollers.

10. A combination dolly-pallet according to claim 1, including a drive mechanism to move the bearer arrangement between the ground engaging and the retracted conditions.

11. A combination dolly-pallet according to claim 10, comprising a dolly, which is convertible to a pallet by moving the bearer arrangement to the ground engaging condition, wherein the drive mechanism is configured to lift the roller arrangement from the ground when the bearer arrangement is in the ground engaging condition.

12. A combination dolly-pallet according to claim 10, wherein an operating member is provided on the drive mechanism to operate the drive mechanism, the operating member comprising a lever.

13. A combination dolly-pallet according to claim 10, wherein two operating members are provided to operate the drive mechanism, each operating member being provided at a respective opposite end of the body, and each operating member comprising a lever.

14. A combination dolly-pallet according to claim 13, wherein the, or each, operating member is movable between an operative position in which the bearer arrangement can be locked in the ground engaging condition or in the retracted condition, and an inoperative condition.

15. A combination dolly-pallet according to claim 1, wherein the body comprises a platform on which the load can be carried, and the body further includes a skirt extending downwardly from the platform, and the, or each, bearer arrangement is provided within the skirt.

16. A combination dolly-pallet according to claim 1, comprising two bearer arrangements, each bearer arrangement being provided at a respective opposite end of the body.

17. A combination dolly-pallet according to claim 1, wherein the bearer arrangement comprises a bearer member and a connecting member to connect the bearer member to the drive mechanism, the connecting member comprising a substantially flat member extending upwardly from the bearer member.

18. A combination dolly-pallet according to claim 17, wherein the bearer arrangement comprises a pair of the connecting members arranged respectively at opposite ends of the bearer member.

* * * * *